United States Patent
White, III et al.

(10) Patent No.: US 11,549,385 B2
(45) Date of Patent: Jan. 10, 2023

(54) AIRFOIL ASSEMBLY WITH SEAL PLATE AND SEAL

(71) Applicant: RAYTHEON TECHNOLOGIES CORPORATION, Farmington, CT (US)

(72) Inventors: Robert A. White, III, Meriden, CT (US); Bryan P. Dube, Columbia, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 40 days.

(21) Appl. No.: 17/307,074

(22) Filed: May 4, 2021

(65) Prior Publication Data

US 2022/0356808 A1    Nov. 10, 2022

(51) Int. Cl.
*F01D 11/00* (2006.01)
*F01D 5/18* (2006.01)
*F02C 7/28* (2006.01)

(52) U.S. Cl.
CPC ............ *F01D 11/005* (2013.01); *F01D 5/189* (2013.01); *F02C 7/28* (2013.01); *F05D 2240/55* (2013.01); *F05D 2240/81* (2013.01); *F05D 2260/201* (2013.01)

(58) Field of Classification Search
CPC .......... F01D 11/005; F01D 5/189; F01D 9/06; F01D 9/065; F05D 2240/55; F05D 2240/81; F05D 2240/12; F05D 2240/126
See application file for complete search history.

(56) References Cited

U.S. PATENT DOCUMENTS

| | | | | |
|---|---|---|---|---|
| 9,335,051 | B2 * | 5/2016 | Jarmon | F23R 3/16 |
| 9,970,317 | B2 * | 5/2018 | Freeman | F01D 25/005 |
| 10,329,950 | B2 * | 6/2019 | Freeman | F01D 25/12 |
| 10,400,616 | B2 | 9/2019 | Tuertscher et al. | |
| 10,655,482 | B2 * | 5/2020 | Freeman | F01D 9/041 |
| 10,774,665 | B2 * | 9/2020 | Greene | F01D 11/005 |

(Continued)

FOREIGN PATENT DOCUMENTS

| | | |
|---|---|---|
| EP | 1852572 | 11/2007 |
| EP | 2546574 | 1/2013 |

(Continued)

OTHER PUBLICATIONS

European Search Report for European Patent Application No. 22170259.0 dated Sep. 23, 2022.

*Primary Examiner* — Eldon T Brockman
(74) *Attorney, Agent, or Firm* — Carlson, Gaskey & Olds, P.C.

(57) ABSTRACT

An airfoil assembly includes an airfoil fairing, a spar, a seal plate, and a seal. The airfoil fairing has a fairing platform and a hollow airfoil section that extends from the fairing platform. The spar has a spar leg that extends in the hollow airfoil section. The spar leg defines a spar leg periphery. The seal plate is secured with the fairing platform. The seal plate has an opening, and the opening has an opening periphery that is complementary to the spar leg periphery. The spar leg extends through the opening. The seal is between the seal plate and the spar leg. The seal seals around the spar leg periphery.

20 Claims, 6 Drawing Sheets

(56) References Cited

U.S. PATENT DOCUMENTS

| | | | | |
|---|---|---|---|---|
| 2002/0127097 A1* | 9/2002 | Darolia | ............... | F01D 5/3084 |
| | | | | 415/137 |
| 2013/0014512 A1* | 1/2013 | Jarmon | ............... | F23R 3/002 |
| | | | | 60/746 |
| 2016/0123163 A1* | 5/2016 | Freeman | ............... | F01D 9/042 |
| | | | | 415/200 |
| 2020/0040750 A1* | 2/2020 | Greene | ............... | F01D 11/005 |
| 2020/0080429 A1* | 3/2020 | Vetters | ............... | F01D 11/08 |
| 2020/0340367 A1 | 10/2020 | Whittle et al. | | |

FOREIGN PATENT DOCUMENTS

| | | |
|---|---|---|
| EP | 3670842 | 6/2020 |
| EP | 3819468 | 5/2021 |
| EP | 3971391 | 3/2022 |
| WO | 2014158278 | 10/2014 |
| WO | 2015041794 | 3/2015 |

* cited by examiner

AIRFOIL ASSEMBLY WITH SEAL PLATE AND SEAL

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

An airfoil assembly according to an example of the present disclosure includes an airfoil fairing that has a fairing platform and a hollow airfoil section extending from the fairing platform. A spar has a spar leg that extends in the hollow airfoil section. The spar leg has a spar leg periphery. A seal plate is secured with the fairing platform. The seal plate has an opening, and the opening has an opening periphery that is complementary to the spar leg periphery. The spar leg extends through the opening. There is a seal between the seal plate and the spar leg that seals around the spar leg periphery.

In a further embodiment of any of the foregoing embodiments, the seal is ceramic.

In a further embodiment of any of the foregoing embodiments, the seal is a crush seal.

In a further embodiment of any of the foregoing embodiments, the seal is selected from the group consisting of a weldment and a crush seal.

In a further embodiment of any of the foregoing embodiments, the seal plate is secured to the fairing platform by at least one fastener.

In a further embodiment of any of the foregoing embodiments, the seal plate includes first and second plate pieces. The fairing platform is sandwiched between the first and second plate pieces, and the fastener extends through the first and second plate pieces and the fairing platform.

In a further embodiment of any of the foregoing embodiments, the fairing platform includes at least one hole in which the at least one fastener is disposed, and at least one of the first or second plate pieces includes a dimple that extends into the at least one hole.

In a further embodiment of any of the foregoing embodiments, the fairing platform includes at least one hole in which the at least one fastener is disposed, and at least one of the first or second plate pieces includes an upstanding boss that extends over the at least one hole.

A further embodiment of any of the foregoing embodiments includes a baffle that extends in the hollow airfoil section. The baffle has a baffle periphery. The seal plate includes an additional opening that has an additional opening periphery that is complementary to the baffle periphery, and the baffle extends through the additional opening.

In a further embodiment of any of the foregoing embodiments, there is an additional seal between the baffle and the seal plate.

In a further embodiment of any of the foregoing embodiments, the fairing platform is hollow and includes inner and outer walls that are radially-spaced apart and define a plenum there between, and the seal plate is secured to the outer wall.

In a further embodiment of any of the foregoing embodiments, the fairing platform defines opposed first and second sides, and the fairing platform is open-sided at the opposed first and second sides.

In a further embodiment of any of the foregoing embodiments, the seal seals completely around the spar leg periphery.

A gas turbine engine according to an example of the present disclosure includes a compressor section, a combustor in fluid communication with the compressor section, and a turbine section in fluid communication with the combustor. The turbine section has airfoil assemblies disposed about a central axis of the gas turbine engine. Each of the airfoil assemblies has an airfoil fairing that includes a fairing platform and a hollow airfoil section extending from the fairing platform. A spar has a spar leg that extends in the hollow airfoil section and has a spar leg periphery. A seal plate is secured with the fairing platform, and thre seal plate has an opening. The opening has an opening periphery that is complementary to the spar leg periphery. The spar leg extends through the opening, and a seal between the seal plate and the spar leg seals around the spar leg periphery.

In a further embodiment of any of the foregoing embodiments, the seal is selected from the group consisting of a weldment and a crush seal.

In a further embodiment of any of the foregoing embodiments, the seal plate is secured to the fairing platform by at least one fastener. The seal plate includes first and second plate pieces. The fairing platform is sandwiched between the first and second plate pieces, and the at least one fastener extends through the first and second plate pieces and the fairing platform.

In a further embodiment of any of the foregoing embodiments, the fairing platform includes at least one hole in which the at least one fastener is disposed, and at least one of the first or second plate pieces includes a dimple that extends into the at least one hole.

In a further embodiment of any of the foregoing embodiments, the fairing platform includes at least one hole in which the at least one fastener is disposed, and at least one of the first or second plate pieces includes an upstanding boss that extends over the at least one hole.

A further embodiment of any of the foregoing embodiments includes a baffle that extends in the hollow airfoil section. The baffle has a baffle periphery. The seal plate includes an additional opening that has an additional opening periphery that is complementary to the baffle periphery. The baffle extends through the additional opening, and there is an additional seal between the baffle and the seal plate.

In a further embodiment of any of the foregoing embodiments, the fairing platform is hollow and includes inner and outer walls that are radially-spaced apart and define a plenum there between. The seal plate is secured to the outer wall. The fairing platform defines opposed first and second sides, and the fairing platform is open-sided at the opposed first and second sides.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
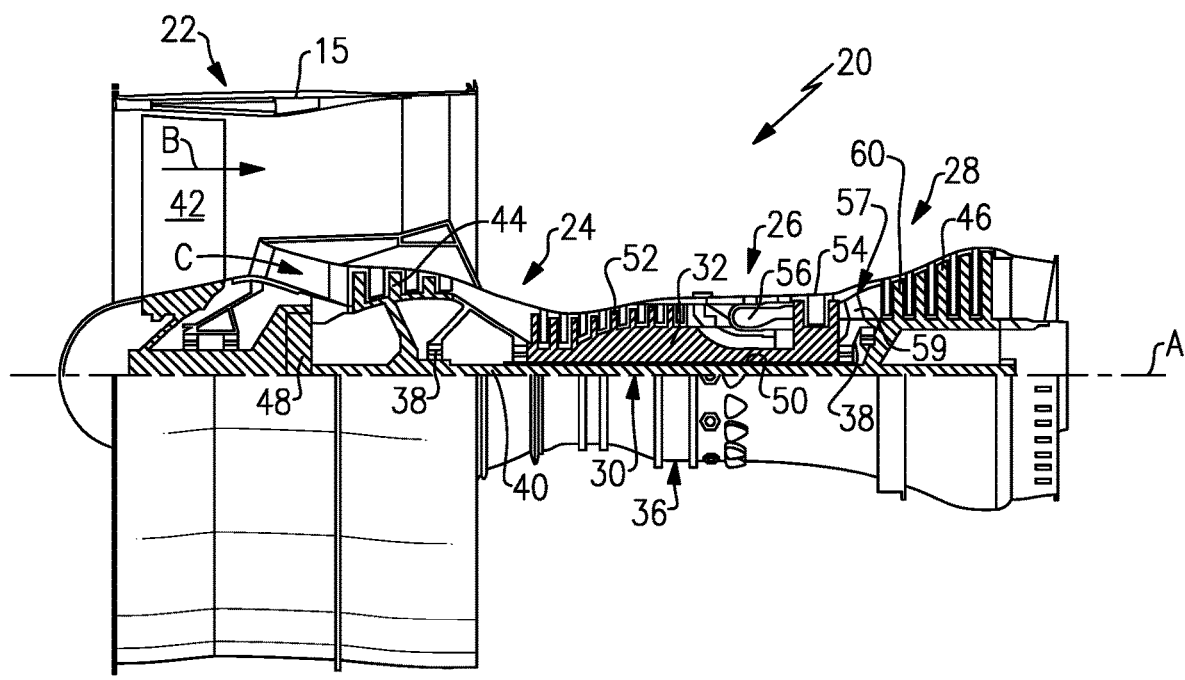
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC)"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of [(Tram ° R)/(518.7° R)]$^{05}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
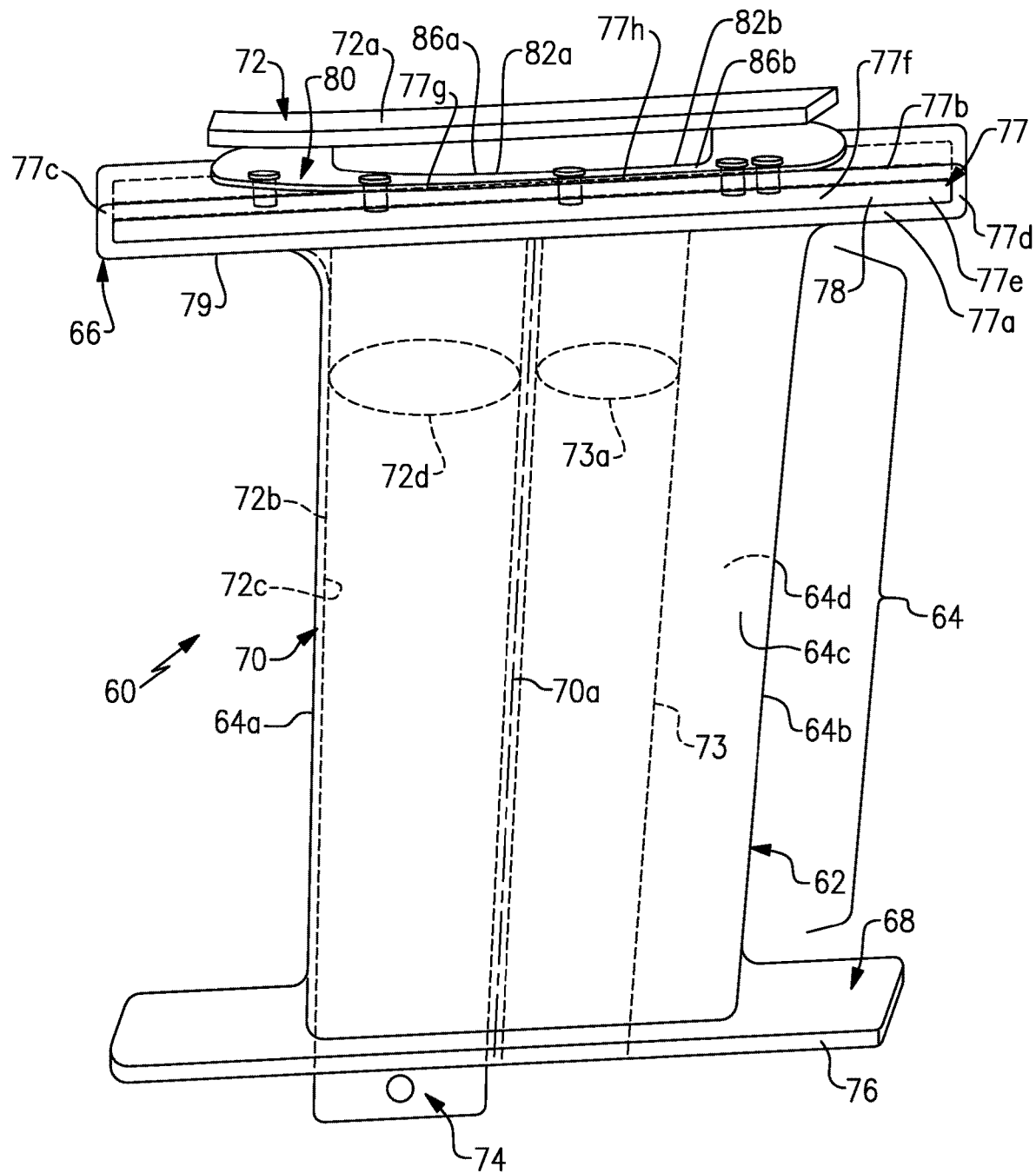
FIG. 2 illustrates an airfoil assembly from the engine.

FIG. 2 illustrates an example of an airfoil assembly 60 from the turbine section 28 of the engine 20 (see also FIG. 1). A plurality of the airfoil assemblies 60 are arranged in a circumferential row around the central engine axis A. It is to be understood that although the examples herein are discussed in context of a vane from the turbine section 28, the examples can be applied to other vanes that have support spars.

The airfoil assembly 60 includes an airfoil fairing 62 that is comprised of an airfoil section 64 and first and second platforms 66/68 between which the airfoil section 64 extends. The airfoil section 64 generally extends in a radial direction relative to the central engine axis A and defines leading and trailing edges 64a/64b, a suction side 64c, and a pressure side 64d. In this example, the first platform 66 is an outer platform and the second platform 68 is an inner platform. The terms such as "inner" and "outer" used herein refer to location with respect to the central engine axis A, i.e., radially inner or radially outer.

The airfoil fairing 62 is a continuous, one-piece body. As an example, the airfoil fairing 62 is formed of a ceramic material, an organic matrix composite (OMC), or a metal matrix composite (MMC). For instance, the material is a ceramic matrix composite, an organic matrix composite (OMC), or a metal matrix composite (MMC). In one example, the ceramic matrix composite (CMC) is formed of ceramic fiber tows that are disposed in a ceramic matrix. The ceramic matrix composite may be, but is not limited to, a SiC/SiC ceramic matrix composite in which SiC fiber tows are disposed within a SiC matrix. Example organic matrix composites include, but are not limited to, glass fiber tows, carbon fiber tows, and/or aramid fiber tows disposed in a polymer matrix, such as epoxy. Example metal matrix composites include, but are not limited to, boron carbide fiber tows and/or alumina fiber tows disposed in a metal matrix, such as aluminum. The fiber tows are arranged in a fiber architecture, which refers to an ordered arrangement of the tows relative to one another, such as a 2D woven ply (e.g. a braid) or a 3D structure.

The airfoil section 64 is hollow and circumscribes an interior through-cavity 70. The airfoil section 64 may have a single through-cavity 70, or the cavity 70 may be subdivided by one or more ribs. In the example shown, the airfoil fairing includes one rib 70a that sub-divides the cavity 70 into forward and aft sub-cavities.

The airfoil assembly 60 further includes a spar 72 that extends through the through-cavity 70 (e.g., the forward sub-cavity) and mechanically supports the airfoil fairing 62. The spar 72 may be formed of a relatively high temperature resistance, high strength material, such as a single crystal metal alloy (e.g., a single crystal nickel- or cobalt-alloy). The spar 72 includes a spar platform 72a and a spar leg 72b that extends from the spar platform 72a into the through-cavity 70. Although not shown, the spar platform 72a may include attachment features that secure it to a fixed support structure, such as an engine case. The spar leg 72b defines an interior through-passage 72c and a spar leg periphery 72d, which is the profile of the outer surface of the spar leg 72b taken at a cross-sectional plane that is parallel to the central engine axis A. For example, the spar leg periphery 72d may generally have, but is not limited to, an airfoil shape, a conical shape, an oval shape, or a circular shape.

The spar leg 72b has a distal end portion that has an attachment 74, such as but not limited to, a pin. The end of the spar leg 72b extends past the platform 68 of the airfoil fairing 62 so as to protrude from the fairing 62. There is support hardware 76 adjacent the platform 68 of the airfoil fairing 62. Although not shown, the support hardware 76, the platform 68 of the airfoil fairing 62, or both may have intermediate structures through which the support hardware 76 interfaces with the platform 68. The end of the spar leg 72b extends through the support hardware 76 and is secured with the support hardware 76 (e.g., by the pin) to prevent the spar leg 72b from being retracted back through the support hardware 76. The airfoil fairing 62 is thus trapped between the support hardware 76 and the spar platform 72a.

In the illustrated example, the airfoil assembly 60 also includes a baffle 73 that extends in the cavity 70 (e.g., the aft sub-cavity). The baffle 73 is generally hollow and may include orifices such that cooling air fed to the baffle 73 is distributed through the orifices to impinge onto the inside surfaces of the airfoil section 64 in the cavity 70. The baffle 73 defines a baffle periphery 73a and protrudes from the platform 66 where it is fed the cooling air. Depending on cooling requirements, the baffle 73 may be excluded in some implementations.

In the illustrated example, at least the platform 66 has a "box" structure 77. The box structure 77 includes a first or inner wall 77a and a second or outer wall 77b that is radially spaced from the first wall 77a to define a plenum 78 there between. The plenum 78 may open to the cavity 70 in the airfoil section 64 but may alternatively be isolated from the cavity 70 by one or more seals. The walls 77a/77b are joined at forward and trailing ends by end walls 77c/77d. Sides 77e/77f are open such that the platform 66 is open-sided. It is to be understood that the platform 68 may have a similar box structure or a single-wall structure.

The box structure 77 is formed by at least one continuous fiber ply, represented at 79. The fiber ply or plies 79 extend through the airfoil section 64 and then turn outwardly to form the wall 77a of the box structure 77. The fiber ply or plies 79 then turn radially outwardly to form the end walls 77c/77d. From the end walls 77c/77d the ply or plies 79 turn back toward the airfoil section 64 to form the wall 77b. Openings 77g/77h are formed in the wall 77b for, respectively, the spar leg 72b and the baffle 73, although in implementations where the baffle 73 is excluded the wall 77b will include only the opening 77g for the spar leg 72b. The periphery of the opening 77g is a complement to the spar leg periphery 72d of the spar leg 72b, and the periphery of the opening 77h is a complement to the baffle periphery 73a. As used herein, the term "complement" or variations thereof refers to an opening (e.g., the openings 77g/77h) that has a shape that fully or substantially fully tracks the shape of a periphery of a mating component (e.g., the spar leg periphery 72d or the baffle periphery 73a) such that the spar leg 72b and baffle 73 fit closely with the corresponding openings 77g/77h through which they extend.

Cooling air, such as bleed air from the compressor section 24, is conveyed into and through the through-passage 72c of the spar leg 72b. This cooling air is destined for a downstream cooling location, such as a tangential onboard injector (TOBI). Cooling air is also provided into the baffle 73 for impingement cooling of the airfoil fairing 62 in the cavity 70. Seals may be provided in the cavity 70 for isolating the aft sub-cavity from the plenum 78. Cooling air is also be provided into the region of the cavity 70 between the wall of the airfoil fairing 62 and the spar leg 72b (e.g., to cool the region of the leading edge 64a and fillets between the airfoil section 64 and platforms 66/68). The cooling air provided to the through-passage 72c of the spar leg 72b and to the baffle 73, however, may be at a different pressure than the cooling air provided to the region in the cavity 70 between the wall of the airfoil fairing 62 and the spar leg 72b. Although there may be close-fits at the interfaces between the spar leg 72b and the edges of the opening 77g in the platform 66 and between the baffle 73 and the opening 77h in the platform 66, the cooling air may leak at these interfaces due to the pressure differential. In this regard, the airfoil assembly 60 further includes a seal plate 80 that is secured to the platform 66 and seals 86a/86b that isolate the cooling air provided to the through-passage 72c and baffle 73 from the cooling air provided to the region between the spar leg 72c and wall of the airfoil fairing 62.

Figure 3A:
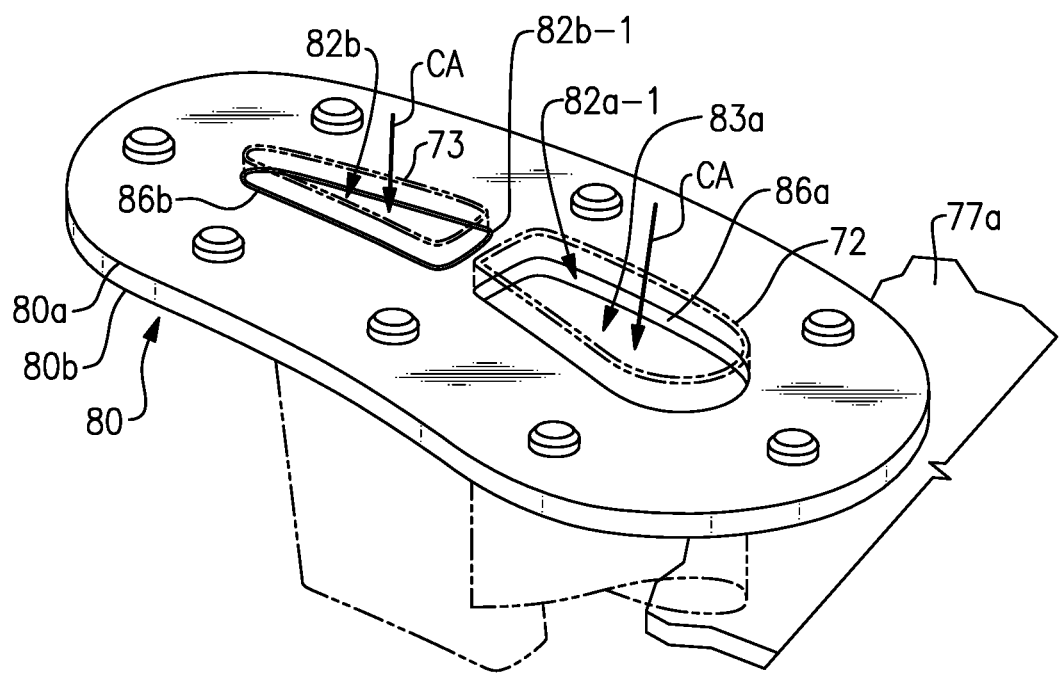
FIG. 3A illustrates a seal plate from the airfoil assembly, but without the airfoil fairing.
Figure 3B:
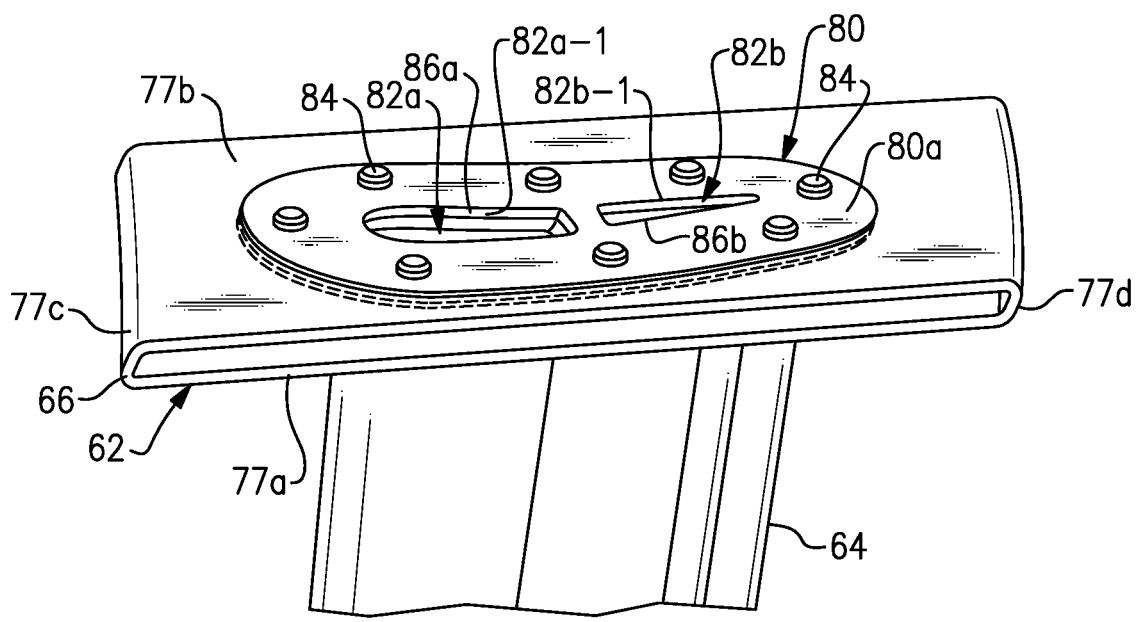
FIG. 3B illustrates the seal plate with the airfoil fairing.

FIG. 3A illustrates a view of the seal plate 80 without the airfoil fairing 62, and FIG. 3B illustrates the seal plate 80 and outer portion of the airfoil fairing 62 without the spar 72. The seal plate 80 is generally a sheet structure of substantially uniform thickness that defines a first and second openings 82a/82b. In this example, the seal plate 80 is comprised of first and second plate pieces 80a/80b. The plate pieces 80a/80b may be formed of a metallic alloy, such as a nickel- or cobalt-based superalloy. The plate pieces 80a/80b are substantially similar in shape and size and are spaced apart, with the wall 77b of the fairing platform 66 sandwiched there between (see FIG. 3A). The seal plate 80 is secured to the platform 66 via one or more fasteners 84. In the illustrated example, the fasteners 84 are spaced around the openings 80a/80b. The fasteners 84 may be, but are not limited to, rivets or bolts. As will be described in more detail later below, the fasteners 84 extend through the seal plate 80 and the wall 77b of the platform 66.

The first opening 82a defines a first opening periphery 82a-1 that is complementary to the spar leg periphery 72d. The second opening 82b defines a second opening periphery 82b-1 that is complementary to the baffle periphery 73a. In implementations where the baffle 73 is excluded, the seal plate 80 will only have the opening 82a. The seals 86a/86b are between, respectively, the seal plate 80 and the spar leg 72b and the seal plate 80 and the baffle 73. The seals 86a/86b seal around the spar leg periphery 72d and the baffle periphery 73a.

The seals 86a/86b may be crush seals or weldments, for example. In the illustrated example, the seal 86a around the spar leg 72b is a crush seal, such as a rope seal, and the seal 86b around the baffle 73 is a weldment. A "crush seal" is a seal that is deformed by compression in a sealing space. Alternatively, the seal 86a may be a weldment and the seal 86b may be a crush seal, or both seals 86a/86b may be crush seals. In a further alternative, both seals 86a/86b may be weldments if thermal expansion differences can be tolerated without compromising the sealing integrity, although access for welding may be limited by the tight space between the spar platform 72a and the wall 77b of the platform 66.

Figure 4A:
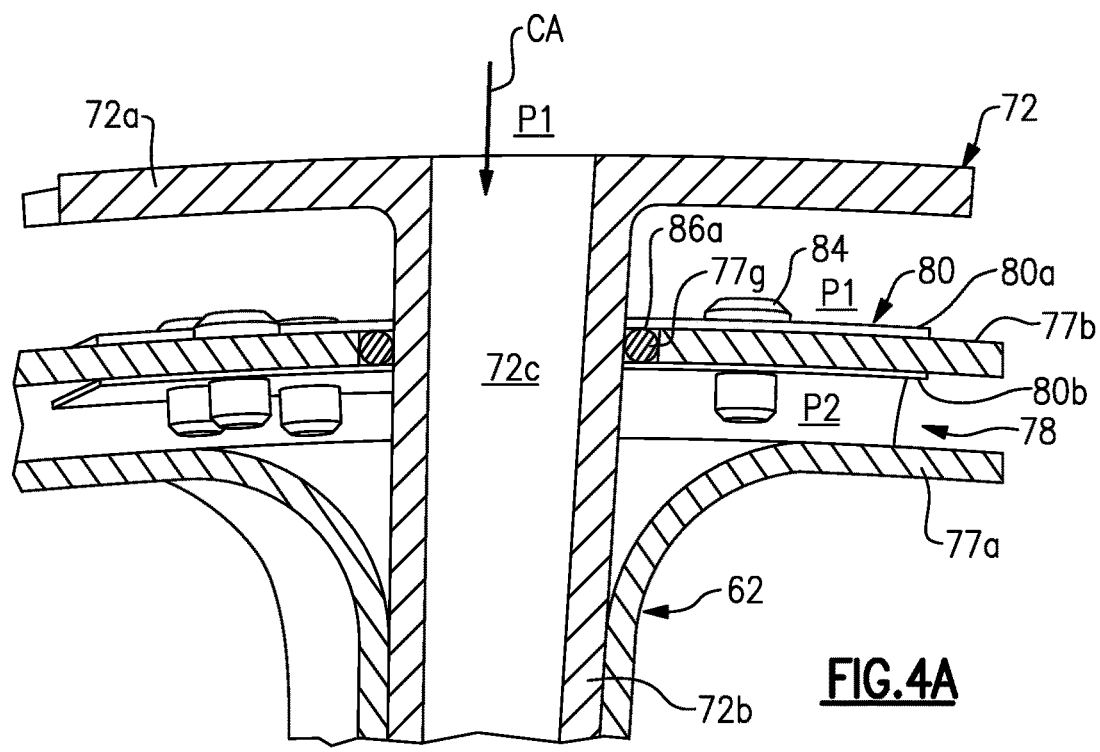
FIG. 4A illustrates the seal plate and seal sealing with the spar in the airfoil assembly.
Figure 4B:
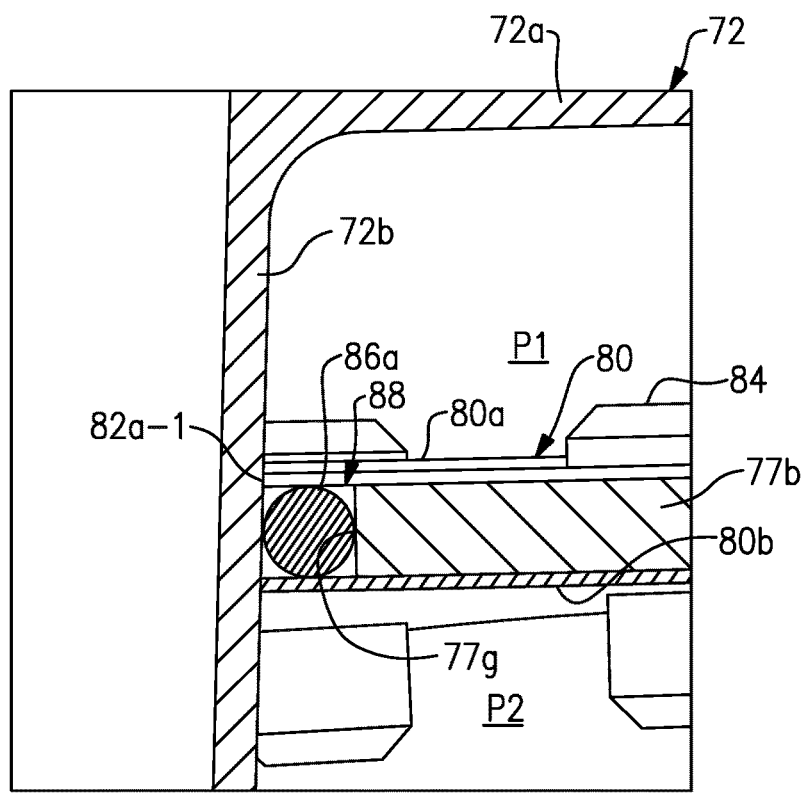
FIG. 4B illustrates a closer view in the region of the seal.

FIG. 4A shows a sectioned view through the airfoil fairing 62, the spar 72, the seal plate 80, and the seal 86a around the spar leg 72b, and FIG. 4B shows a closer view of the region of the seal 86a. As shown, the plate pieces 80a/80b sandwich the wall 77b of the platform 66. The edge of the wall 77b of the platform 66 is offset from the edges of the first opening 82a in the seal plate 80 to thereby form a channel 88 around the first opening periphery 82a-1. The seal 86a, which is a rope seal in this example, is retained in the channel 88 and against the spar leg 72b to seal there with. The seal 86a isolates the region indicated at P1 from the region indicated at P2 such that cooling air CA does not leak from P1 to P2, or vice versa depending on the pressures.

Figure 5:
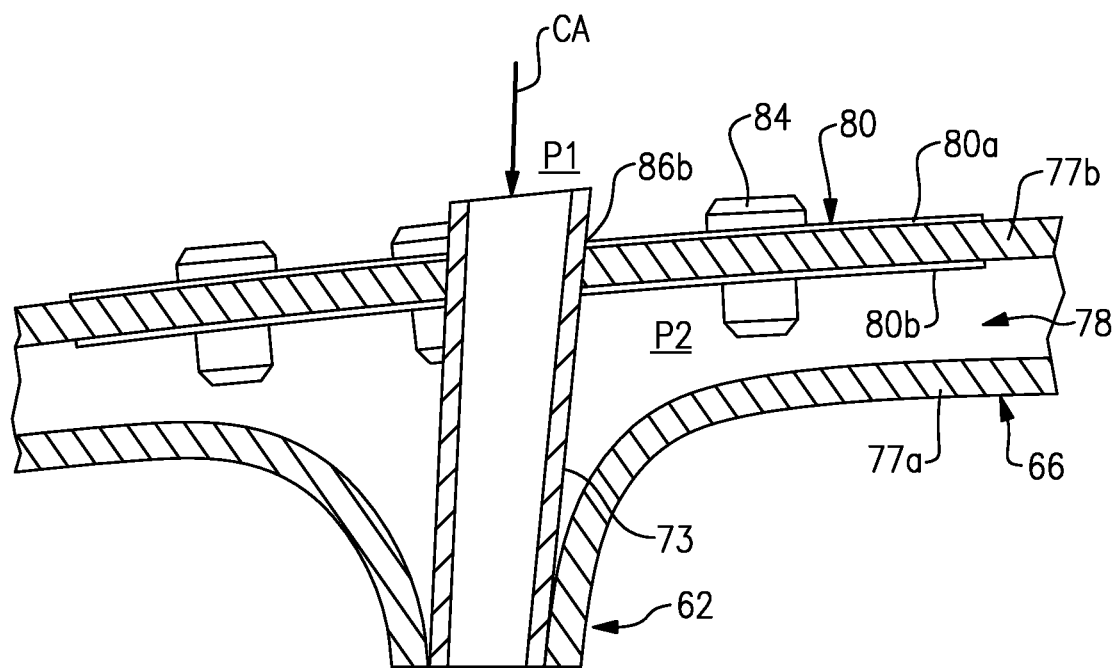
FIG. 5 illustrates the seal plate and seal sealing with the baffle in the airfoil assembly.

FIG. 5 shows a sectioned view through the airfoil fairing 62, the baffle 73, the seal plate 80, and the seal 86b around the baffle 73. The plate pieces 80a/80b sandwich the wall 77b of the platform 66. At least the edge of the plate piece 80a is welded to the baffle 73 to form the seal 86b. The plate piece 80b may also be welded, however, since the weld location is inside the plenum 78, access for welding may be limited. The seal 86b also isolates the region indicated at P1 from the region indicated at P2 such that cooling air CA does not leak from P1 to P2, or vice versa depending on the pressures.

Figure 6A:
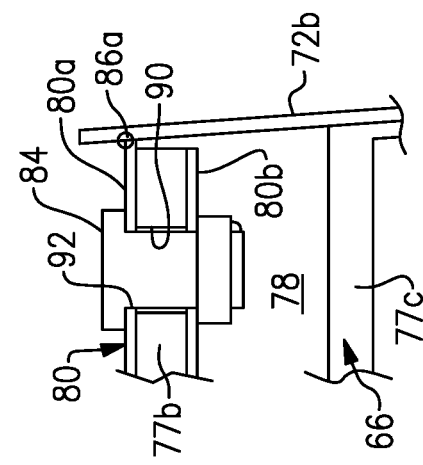
FIG. 6A illustrates an example baseline fastener configuration.
Figure 6C:
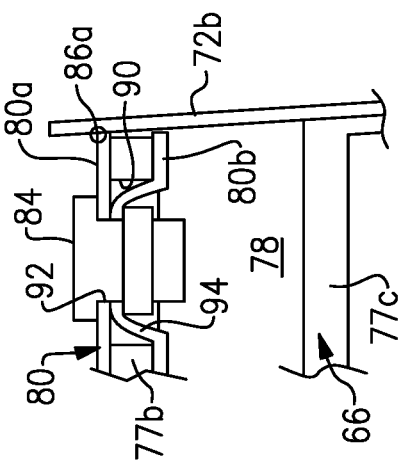
FIG. 6C illustrates a fastener configuration in which the inner plate piece of the seal plate has a dimple.

FIGS. 6A to 6F illustrate example configurations of the fasteners 84. The examples are shown with respect to sealing with the spar leg 72b, however, it is to be understood that the examples also apply to sealing with the baffle 73. Referring to FIG. 6A, the wall 77b of the platform 66 includes a hole 90 and the seal plate 80 includes a hole 92 that is aligned with the hole 90. The fastener 84 is received through the holes 90/92 to secure the seal plate 80 to the wall 77b. In the examples of FIGS. 6A to 6F, the fastener 84 is a bolt. Optionally, the nut of the bolt may be welded to the shank of the bolt, to facilitate the prevention of loosening. The plate piece 80a is welded to the spar leg 72b to form the seal 86a (i.e., a weldment). The configuration here is a "baseline" example of a simple joint in which the hole 92 is substantially the same diameter as the hole 90 and the fastener 84 clamps the plate pieces 80a/80b around the wall 77b. The plate pieces 80a/80b in this and the following examples are relatively ductile (as compared to CMC) and thus facilitate removal of compressive load that the fastener 84 applies to the stack, reduction in stress on the CMC wall 77b, and maintaining fastener tension even after some extent of creep via the elasticity of the plate pieces 80a/80b.

Figure 6B:
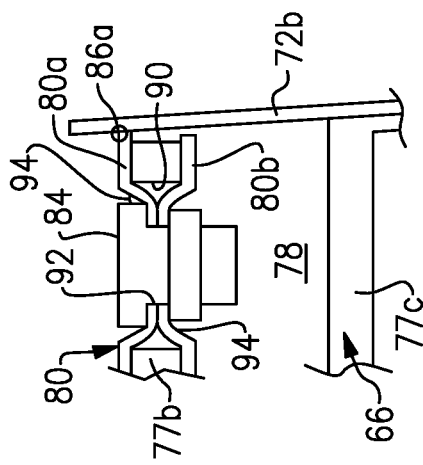
FIG. 6B illustrates a fastener configuration in which the seal plate has dimples.

In the configuration in FIG. 6B, the hole 90 in the wall 77b is of larger diameter than the hole 92 in the seal plate 80. Here, each of the plate pieces 80a/80b includes a dimple 94 that extends into the hole 90. The fastener 84 clamps the dimples 94 together such that the wall 77b is trapped between the plate pieces 80a/80b adjacent to the dimples 94. In this configuration, the fastener 84 does not directly compress the wall 77b, as the bolt tension is applied at the dimples 94 without the wall 77b locally there between. Such a configuration may facilitate reducing stresses on the wall 77b in comparison to the direct clamping as in FIG. 6A and mitigating thermal growth mismatch and tolerances associated with the CMC of the wall 77b.

Figure 6D:
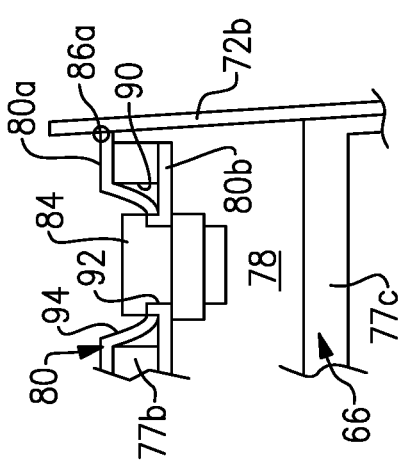
FIG. 6D illustrates a fastener configuration in which the outer plate piece of the seal plate has a dimple.

The configuration of FIG. 6B is a combination of the examples of FIGS. 6A and 6B. Here, only the plate piece 80b has a dimple 94, while the plate piece 80a is flat. Alternatively, the plate piece 80b may be flat and the plate piece 80a may have the dimple 94, as shown in FIG. 6D. Similar to the example in FIG. 6B, the fastener 84 in FIGS. 6C and 6D does not directly compress the wall 77b, as the bolt tension is applied at the dimple 94 without the wall 77b locally there between. These configurations may also facilitate reducing stresses on the wall 77b in comparison to the direct clamping as in FIG. 6A.

Figure 6E:
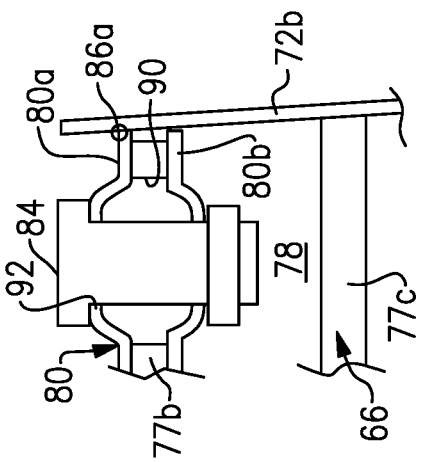
FIG. 6E illustrates a fastener configuration in which the seal plate has an upstanding boss.

In the configuration in FIG. 6E, the plate pieces each include an upstanding boss 96 that extends over the hole 90 in the wall 77b. Here, the bosses 96 serve as springs to apply an additional pre-load on the wall 77b that may facilitate taking up differences in thermal expansion between the seal plate 80 and the wall 77b to thereby maintain compression on the wall 77b. Additionally, the pre-load provided by the bosses 96 may also serve to keep the locally adjacent regions of the plate pieces 80a/80b from tending to lift away from the wall 77b due to "levering" from the fastener 84. For instance, if the fastener 84 in FIG. 6B were over-tightened, the locally adjacent regions of the plate pieces 80a/80b may tend to lever, i.e., spread outwardly, and lift away from the wall 77b. However, the additional pre-load provided by the bosses 96 facilitates prevention of such levering.

Figure 6F:
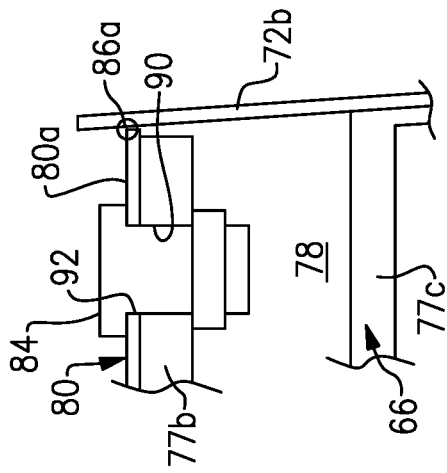
FIG. 6F illustrates a fastener configuration in which the seal plate has only a single plate piece.

Lastly, the configuration in FIG. 6F is similar to that of FIG. 6A except that the seal plate 80 excludes the plate piece 80b and has only the single plate piece 80a. Such a configuration has a relatively less complex assembly, as it eliminates the installation of the plate piece 80b.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil assembly comprising:
    an airfoil fairing having a fairing platform and a hollow airfoil section extending from the fairing platform;
    a spar having a spar leg extending in the hollow airfoil section, the spar leg having a spar leg periphery;
    a seal plate secured with the fairing platform, the seal plate having an opening, the opening having an opening periphery that is complementary to the spar leg periphery, the spar leg extending through the opening; and
    a seal between the seal plate and the spar leg, the seal sealing around the spar leg periphery.

2. The airfoil assembly as recited in claim 1, wherein the seal plate is ceramic.

3. The airfoil assembly as recited in claim 1, wherein the seal is a crush seal.

4. The airfoil assembly as recited in claim 1, wherein the seal is selected from the group consisting of a weldment and a crush seal.

5. The airfoil assembly as recited in claim 1, wherein the seal plate is secured to the fairing platform by at least one fastener.

6. The airfoil assembly as recited in claim 5, wherein the seal plate includes first and second plate pieces, the fairing platform is sandwiched between the first and second plate pieces, and the at least one fastener extends through the first and second plate pieces and the fairing platform.

7. The airfoil assembly as recited in claim 6, wherein the fairing platform includes at least one hole in which the at least one fastener is disposed, and at least one of the first or second plate pieces includes a dimple that extends into the at least one hole.

8. The airfoil assembly as recited in claim 6, wherein the fairing platform includes at least one hole in which the at least one fastener is disposed, and at least one of the first or second plate pieces includes an upstanding boss that extends over the at least one hole.

9. The airfoil assembly as recited in claim 1, further comprising a baffle that extends in the hollow airfoil section, the baffle has a baffle periphery, the seal plate includes an additional opening having an additional opening periphery that is complementary to the baffle periphery, and the baffle extends through the additional opening.

10. The airfoil assembly as recited in claim 9, wherein there is an additional seal between the baffle and the seal plate.

11. The airfoil assembly as recited in claim 1, wherein the fairing platform is hollow and includes inner and outer walls that are radially-spaced apart and define a plenum there between, and the seal plate is secured to the outer wall.

12. The airfoil assembly as recited in claim 11, wherein the fairing platform defines opposed first and second sides, and the fairing platform is open-sided at the opposed first and second sides.

13. The airfoil assembly as recited in claim 1, wherein the seal seals completely around the spar leg periphery.

14. A gas turbine engine comprising:
    a compressor section;
    a combustor in fluid communication with the compressor section; and
    a turbine section in fluid communication with the combustor, the turbine section having airfoil assemblies disposed about a central axis of the gas turbine engine, each of the airfoil assemblies includes:
        an airfoil fairing having a fairing platform and a hollow airfoil section extending from the fairing platform,
        a spar having a spar leg extending in the hollow airfoil section, the spar leg having a spar leg periphery,
        a seal plate secured with the fairing platform, the seal plate having an opening, the opening having an opening periphery that is complementary to the spar leg periphery, the spar leg extending through the opening, and
        a seal between the seal plate and the spar leg, the seal sealing around the spar leg periphery.

15. The gas turbine engine as recited in claim 14, wherein the seal is selected from the group consisting of a weldment and a crush seal.

16. The gas turbine engine as recited in claim 14, wherein the seal plate is secured to the fairing platform by at least one fastener, the seal plate includes first and second plate pieces, the fairing platform is sandwiched between the first and second plate pieces, and the at least one fastener extends through the first and second plate pieces and the fairing platform.

17. The gas turbine engine as recited in claim 16, wherein the fairing platform includes at least one hole in which the at least one fastener is disposed, and at least one of the first or second plate pieces includes a dimple that extends into the at least one hole.

18. The gas turbine engine as recited in claim 16, wherein the fairing platform includes at least one hole in which the at least one fastener is disposed, and at least one of the first or second plate pieces includes an upstanding boss that extends over the at least one hole.

19. The gas turbine engine as recited in claim 16, further comprising a baffle that extends in the hollow airfoil section, the baffle has a baffle periphery, the seal plate includes an additional opening having an additional opening periphery that is complementary to the baffle periphery, the baffle extends through the additional opening, and there is an additional seal between the baffle and the seal plate.

20. The gas turbine engine as recited in claim 19, wherein the fairing platform is hollow and includes inner and outer walls that are radially-spaced apart and define a plenum there between, the seal plate is secured to the outer wall, the fairing platform defines opposed first and second sides, and the fairing platform is open-sided at the opposed first and second sides.

* * * * *